United States Patent

Kashioka

[11] Patent Number: 4,484,347
[45] Date of Patent: Nov. 20, 1984

[54] METHOD OF IMAGE TRANSFORMATION IN A DISPLAY DEVICE

[75] Inventor: Seiji Kashioka, Hachioji, Japan
[73] Assignee: Hitachi, Ltd., Tokyo, Japan
[21] Appl. No.: 348,668
[22] Filed: Feb. 16, 1982
[30] Foreign Application Priority Data Feb. 23, 1981 [JP] Japan ................... 56-24289

[51] Int. Cl.$^3$ .................. G06K 9/44; G06K 9/36; H04N 1/40
[52] U.S. Cl. ........................... 382/47; 382/46; 382/54; 358/287
[58] Field of Search ............. 382/41, 44, 46, 47, 382/50-54, 56; 340/723, 724, 727, 728, 731, 793; 358/260, 160, 180, 287

[56] References Cited

U.S. PATENT DOCUMENTS 3,976,982  8/1976  Eiselen ......................... 382/47
4,155,097  5/1979  Lux ............................. 358/260
4,365,273 12/1982  Yamada et al. ................ 382/56
4,381,547  4/1983  Ejiri ............................ 382/47

OTHER PUBLICATIONS

"Image Enlarging/Reducing Method" by Miyai Digest for the 20th National Congress of the Japanese Institute of Information Processing; pp. 463-464 (1979).

Primary Examiner—John C. Martin
Assistant Examiner—Michael D. Parker
Attorney, Agent, or Firm—Antonelli, Terry & Wands

[57] ABSTRACT

In an image transformation method in an image display apparatus for displaying a digital image derived by transforming an original digital image, each of intensities of second picture elements including at least three points on the original digital image surrounding a first point on the original digital image, corresponding to coordinates of a first picture element on a transformed digital image is weighted by a value related to a length of at least one of two sides of a polygon which apexes are the second picture element opposing to its own second picture element and the first point, the two sides surrounding the first point, and the intensity of the first picture element is determined based on the calculated intensities of the second picture elements.

17 Claims, 20 Drawing Figures (a) → (b)

F I G. 15
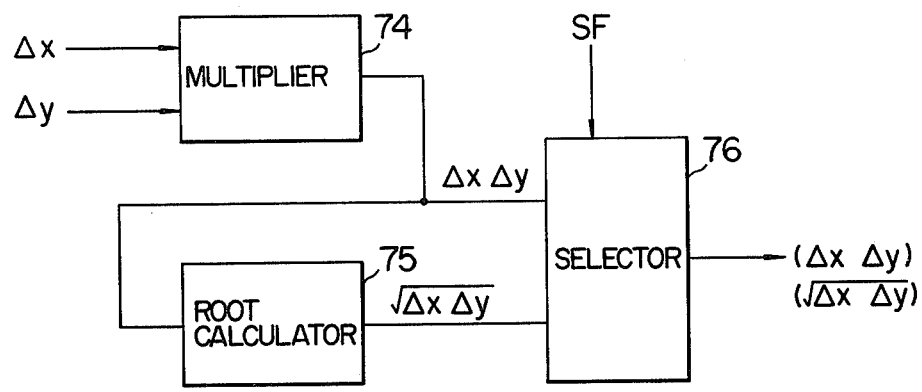
F I G. 16
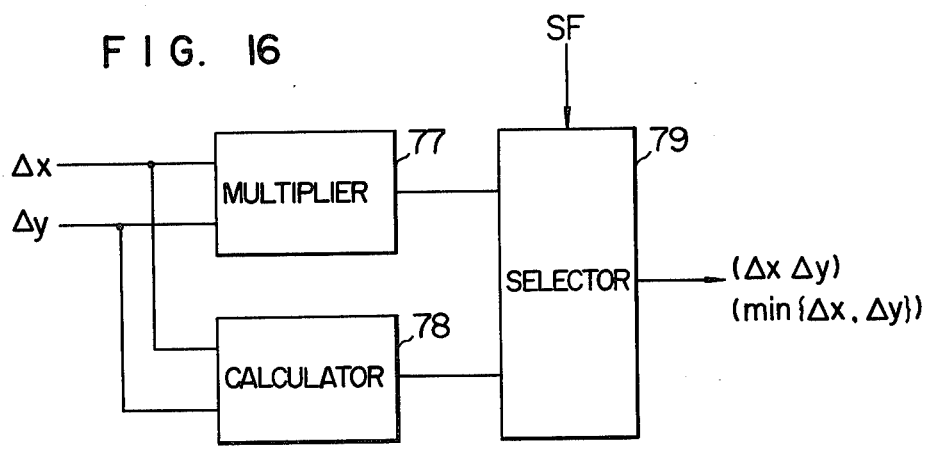
F I G. 17
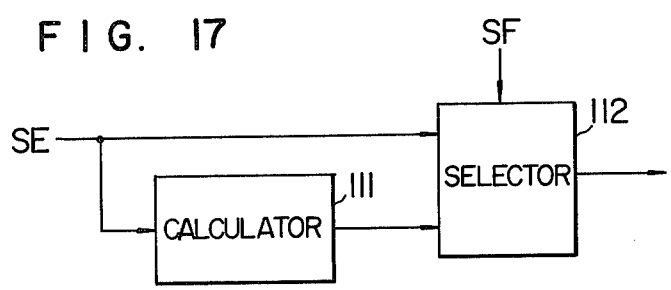

METHOD OF IMAGE TRANSFORMATION IN A DISPLAY DEVICE

BACKGROUND OF THE INVENTION

1. Field of the Invention

The present invention relates to a method of image transformation for enlarging, reducing or rotating a digital image for display in an image display device which is used for processing and displaying the digital image, such as a display device or a printer.

2. Description of the Prior Art

In a display device or a printer which displays characters, symbols, line segments or graphic patterns, it is often necessary to output characters and symbols in a variety of sizes for various reasons, such as for the purpose of calling the attention of a user to certain information or putting headings or footnotes in the display.

In such a case, it may be possible to produce patterns such as characters and symbols of different respective sizes, but this raises the problem that an increase of memory capacity is required for storing the increased number of patterns of different sizes. If patterns of any desired size can be generated from patterns of a single size, such as character patterns or symbol patterns, the memory capacity can be maintained. The advantage of the above is remarkable particularly when several thousands of KANJI character patterns are to be displayed.

It has been proposed to represent each picture element of a digital pattern as shown in (a) of FIG. 1 by n×m picture elements in a pattern as shown in (b) of FIG. 1 (in which n=m=3) or to make an interpolation when diagonal black picture elements are present in order to compensate for jaggyness of the diagonal line when the digital pattern is displayed by the above method, as disclosed in the Japanese Published Unexamined Patent Application No. 50-10925. However, those approaches are not practical because the pattern can be enlarged only by a factor of an integer.

In the Japanese Published Unexamined Patent Application 50-3732, it is proposed to detect transitional points from white to black picture elements or black to white picture elements in rows and columns, determine projection distributions of the transitional points in rows and columns, compare the projection distributions in rows and columns, rearrange the projection distributions in the order of their magnitude and select information of only a desired number of rows and columns depending on a desired reduction factor so that any desired non-integer reduction factor may be attained.

In this method, however, it is necessary to detect the transitional points in rows and columns, determine the projection distributions in rows and columns, rearrange the projection distributions in the order of magnitude and select the desired row and column information in order to obtain the desired pattern. Thus, if those steps are to be implemented by hardware, large scale hardware equipment is required. If they are to be implemented by a software technique, a long process time is required.

SUMMARY OF THE INVENTION

It is a principal object of the present invention to provide a method of image transformation of a digital pattern which is very simple and can reduce the scale of an apparatus to effect such transformation and reduce the process time.

It is another object of the present invention to provide a method of image transformation of a digital pattern which can provide a very high quality digital pattern.

In order to achieve the above objects, in accordance with a feature of the present invention, each of the intensities of second picture elements including at least three points on an original digital image surrounding a first point on the original digital image, corresponding to coordinates of a first picture element on a transformed digital image is weighted by a value related to the length of at least one of two sides of a polygon whose apexes are the second picture elements opposing its own second picture element and the first point, said two sides surrounding the first point, whereby the intensity of the first picture element is determined by summing the results of the above calculations.

DETAILED DESCRIPTION OF THE PREFERRED EMBODIMENTS

A principle of the present invention will be first described in detail.

Figure 1:
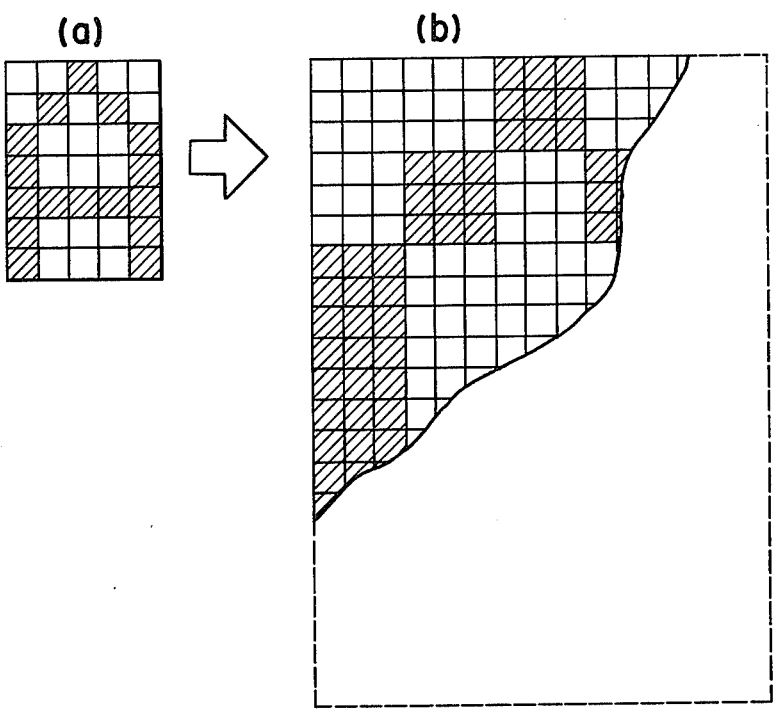
FIG. 1 illustrates a prior art method of pattern transformation of a digital pattern.
Figure 2A:
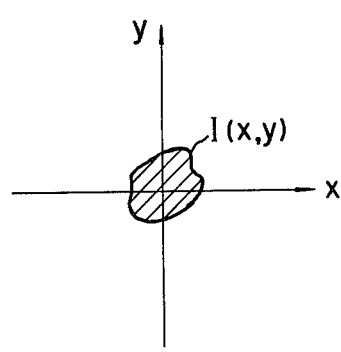
FIGS. 2 through 4 illustrate a principle of the present invention.

An original image as shown in FIG. 2a is represented by I (x, y), which means that the intensity of the image at coordinates (x, y) is I. If the original image is a binary pattern as shown in FIG. 1, the intensity I is "0" or "1". If the original image is a gray level image (multi-valued image) such as a digitized television image, the intensity I assumes a multi-level value.

Figure 2B:
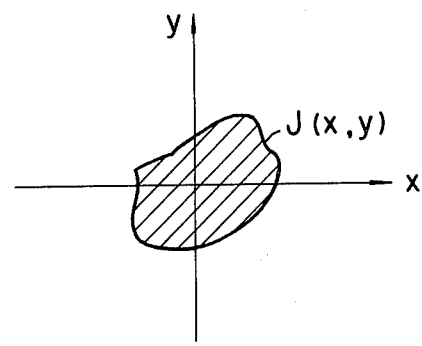

Assuming that the original image I (x, y) is enlarged or reduced to transform it into an image J (x, y) as shown in FIG. 2b. When those images I (x, y) and J (x, y) are not digitized, the following relations are met:

$$J(x, y) = I(X, Y) \quad (1)$$

where $$X = \alpha x \quad (2)$$

$$Y = \beta y \quad (3)$$

and $\alpha$ and $\beta$ are enlargement or reduction coefficients in the x-direction and y-direction, respectively, and they may be either integers or any real numbers.

Where the original image I (x, y) is transformed to the image J (x, y) by rotating the original image, the following equations (4) and (5) are used in place of the equations (2) and (3):

$$X = x \cos\theta + y \sin\theta \quad (4)$$

$$Y = x \sin\theta - y \cos\theta \quad (5)$$

By multiplying the left sides of the equations (4) and (5) by the factors of $\alpha$ and $\beta$, respectively, the combination of the enlargement or the reduction and the rotation is attained.

The coefficients $\alpha$ and $\beta$ of the equations (2) and (3) need not be constants but may be functions of x and y, respectively.

By varying the equations (2) to (5), various transforms of the image other than those described above, such as parallel movement of the image, can be attained.

As described above, where the image is not digitized it can be expressed by simple mathematical expressions as shown above, but where the image is digitized the coordinates (x, y) can assume only integer values and hence I (x, y) in the equation (1) makes no sense.

Thus, in order to allow the equations (1) to be applicable to the digital image, the following technique is used.

The following equations (6) and (7) are met $$[X] \leq X < [X] + 1 \quad (6)$$

$$[Y] \leq Y < [Y] + 1 \quad (7)$$

where [ ] represents the Gauss notation. [X], [X]+1, [Y], [Y]+1 are integers.

Figure 3:
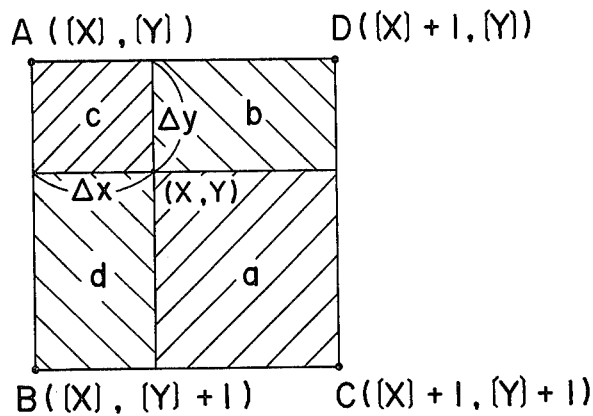

Coordinates (X, Y) of a point on the original image defined by the equations (2) and (3) or (4) and (5) (hereinafter referred to as a point under consideration) correspond to a point in an area surrounded by four picture element points on the original image, ([X], [Y]), ([X], [Y]+1), ([X]+1, [Y]) and ([X]+1, [Y]+1) as shown in FIG. 3. The intensity I (X, Y) at the point (X, Y) under consideration is most naturally determined by interpolation from the intensities of those four points.

In the present invention, areas are used as weighting factors in the interpolation. For example, in FIG. 3, the intensity I ([X], [Y]) at the point A is multiplied by the weight of an area a of a rectangle including the opposing point C and the point (X, Y) under consideration, and the intensities I ([X], [Y]+1), I ([X]+1, [Y]+1), and I ([X]+1, [Y]) at the points B, C and D are multiplied by areas b, c and d of the other rectangles, respectively, and the resulting products are summed to produce the intensity I (X, Y) at the point (X, Y) under consideration. These relations are represented by the following equations:

$$I(X, Y) = (1-\Delta x)(1-\Delta y)I([X], [Y]) + (1-\Delta x)\Delta y I([X], [Y]+1) + \Delta x \Delta y I([X]+1, [Y]+1) + \Delta x(1-\Delta y)I([X]+1, [Y]) \quad (8)$$

$$\Delta x = X - [X] \quad (9)$$

$$\Delta y = Y - [Y] \quad (10)$$

From the equations (8) to (10) and the equations (1) to (5), the intensity of the transformed image J (x, y) can be determined.

In this manner, the densities at the four points A, B, C and D shown in FIG. 3 are reflected to the intensity I (X, Y) of the point (X, Y) under consideration by the weights corresponding to the distances from the points (X, Y) under consideration. As seen from FIG. 3, the sum of the four weighting factors is always 1 because they are fractions of a square having an area of unity. Accordingly, the intensity distribution of the transformed image J (x, y) is kept unchanged from the intensity distribution of the original image I (x, y). In other words, the calculation of the intensity I (X, Y) in the equation (8) includes a normalization of the intensity.

For example, where the intensities at the four points A, B, C and D on the original image I (x, y) are i, respectively, the intensity at the point (X, Y) under consideration is i independently of the values of x and y. If the intensity at the point A on the original image is i and the intensities at other points B, C and D are zero, the intensity at the point (X, Y) under consideration is approximately equal to i if the point (X, Y) is close to the point A but it approaches zero as the point (X, Y) goes farther from the point A.

While the square is shown in the illustrated example, any quadrilateral having two parallel opposing sides may be used, or it may be even a triangle. In the latter case, the intensities at the respective apexes are multiplied by areas of triangles each defined by two opposing apexes and the point under consideration.

In the present method of transformation, if the image I (x, y) to be handled is a gray level image, the transformed image J (x, y) is readily produced by the above process. On the other hand, if the image I (x, y) to be handled is a binary image as shown in FIG. 1, the gray level image J (x, y) produced by the above process is digitized by an appropriate threshold circuit to produce the binary image. In this case, since the result of the calculation by the equation (8) lies between "0" and "1" because of the normalization, it is preferable to use a threshold level of $\frac{1}{2}$.

The intensity distribution of the gray level image produced by the above process has a Gaussion distribution around a point on the transformed image corresponding to a point on the original image I (x, y) at which the line lies. Accordingly, if the threshold level is higher than $\frac{1}{2}$, the transformed image reproduces a thin line, and if the threshold level is lower than $\frac{1}{2}$, the transformed image reproduces a thick line. Therefore, when a binary image is handled, the line width of the transformed image can be controlled by changing the threshold level.

Modifications of the present invention described above now will be explained in detail.

Figure 4A:
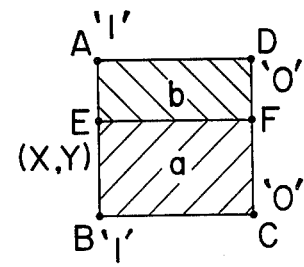

FIG. 4 shows a special case of FIG. 3. As shown in FIG. 4a, when the intensities at the points A and B are "1" and the intensities at the points C and D are "0" and if the point (X, Y) under consideration is on a line $\overline{AB}$, the intensity at that point is "1" wherever it is from the relation of the equation (8) and the continuity of the line is assured for the transformed image.

Figure 4B:
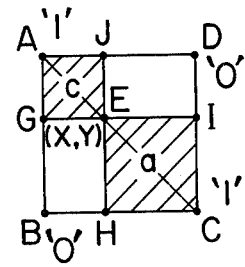
Figure 5A:
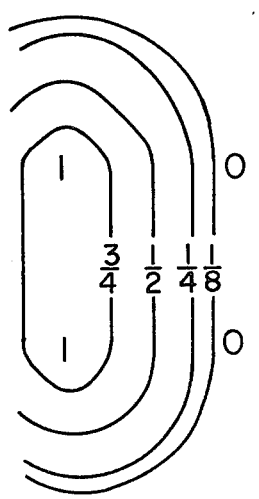
FIGS. 5 and 6 illustrate modifications of the present invention.

However, when the intensities at the points A and C are "1" and the intensities at the points B and D are "0" as shown in FIG. 4b and the point (X, Y) under consideration is on a diagonal line $\overline{AC}$, the intensity of the point (X, Y) under consideration determined by the equation (8) is represented by a sum of the areas a and c, which varies from 1 to ½ depending on the position of the point under consideration. Accordingly, for such diagonal line, the continuity of the line is not assured in the transformed image. Thus, in the case of FIG. 4a, the intensity of the transformed image is given by FIG. 5a, and when it is digitized by the threshold level of ½, the line width is uniform and the continity of the line is assured, but in the case of FIG. 4b, the intensity of the transformed image is given by FIG. 5b and when it is digitized by the threshold level of ½ the line is jagged with certain portions being thin.

Figure 5B:
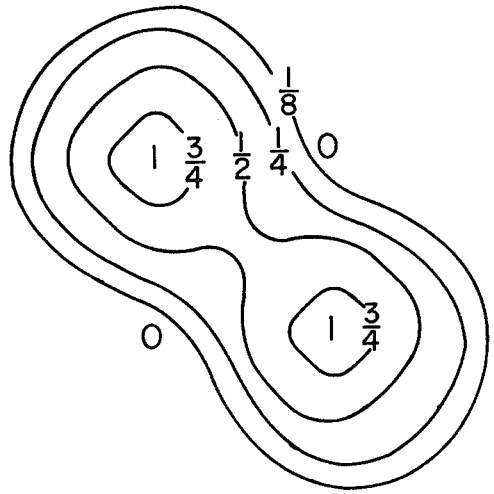

This phenomenon is due to the fact that the original image is divided in a grid pattern and the picture elements lie at the crosspoints of the grid. In such a divided image, the pitches of the picture elements in the x and y directions and the pitches of the picture elements in diagonal directions are different. The pitches of the picture elements in the 45 degrees diagonal directions are $\sqrt{2}$ times as large as the pitches of the picture elements in the x and y directions (horizontal and vertical directions) and hence the picture element density in the diagonal direction is smaller than the picture element density in the horizontal and vertical directions. As a result, the phenomenon as shown in FIG. 5b takes place. Accordingly, when such an image is displayed, it is hard to observe.

Figure 6:
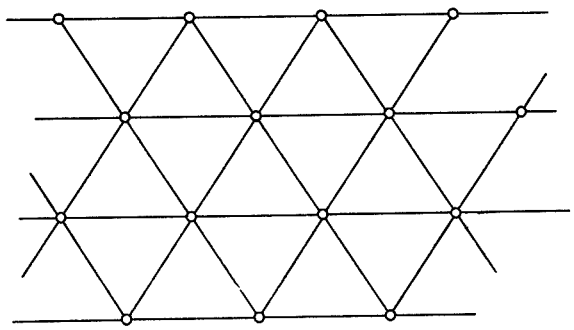

In the embodiment of the present invention, in order to avoid such a phenomenon, the following techniques are employed:

(1) Since it is considered that the above phenomenon is due to the fact that the pitches of the picture elements in the horizontal and vertical directions are different from those in the diagonal directions, the original image is divided by a triangle grid as shown in FIG. 6 so that the pitches of the picture cells are equal in every direction.

In this manner, the phenomenon as shown in FIG. 5b is avoided and the continuity of the line in the diagonal direction is assured.

(2) As seen from FIG. 5b, when the threshold level is higher than ½, the jaggyness appears remarkably in the diagonal line but as the threshold level is lowered the line width of the diagonal line increases and the jaggyness of the line becomes less noticeable. Accordingly, the circuit is designed such that the threshold level is lowered when the diagonal line is detected.

As seen from FIG. 5b, the jaggyness of the diagonal line is significantly reduced by changing the threshold level from ½ to ¼, for example.

(3) Referring to FIG. 4, particularly FIG. 4a, the weight to the point A corresponds to the area a of the rectangle EBCF. Since the length of the line segment $\overline{BC}$ is equal to unity, the area a is given by the following equation (11).

$$a = \overline{EB} \times \overline{BC} = \overline{EB} \quad (11)$$

Similarly, the weight to the point B corresponds to the area b of the rectangle AEFD and the area b is given by the following equation (12).

$$b = \overline{AE} \times \overline{EF} = \overline{AE} \quad (12)$$

Thus, when the point (x, y) under consideration is on the line segment $\overline{AB}$, the weights of the intensities at the points A and B are divided by the proportion of the point E or the point (X, Y) under consideration on the line segment $\overline{AB}$ Accordingly, by applying the above to the case where the point (X, Y) under consideration is on the line segment $\overline{AC}$, it corresponds to division of the weights of the intensities of the points A and C by the ratio of the line segment $\overline{AE}$ and the line segment $\overline{EC}$.

As seen from FIG. 4b, the following relations are met:

$$\overline{AE}/\overline{EC} = \overline{GE}/\overline{EI} \quad (13)$$

$$\overline{GE} + \overline{EI} = 1 \quad (14)$$

Thus, $\overline{GE}$ and $\overline{EI}$ may be used as the weights of the points A and C.

The line segments $\overline{GE}$ and $\overline{EI}$ are given by the following equations:

$$\overline{GE} = \sqrt{c} \quad \overline{EI} = \sqrt{a} \quad (15)$$

Thus, when the intensities at the two points on the diagonal line are "1" and the intensities at other points are "0" as shown in FIG. 4b, the intensity is calculated using the following equation (16) instead of the equation (8) described above.

$$I(X, Y) = \sqrt{(1-\Delta x)(1-\Delta y)} I([X], [Y]) + \sqrt{(1-\Delta x)\Delta y} I([X], [Y]+1) + \sqrt{\Delta x \Delta y} I([X]+1, [Y]+1) + \sqrt{\Delta x(1-\Delta y)} I([X]+1, [Y]) \quad (16)$$

In this manner, when the point (X, Y) under consideration is on the line segment $\overline{AC}$ in FIG. 4b, the intensity at that point is always "1" and the jaggyness of the diagonal line as shown in FIG. 5b no longer appears even when the threshold level is ½. This approach is effective when the thick line width approach as described in (2) above is not desirable.

(4) Since the approach (3) above needs the root calculation as shown in the equation (16), the burden on the hardware is large.

Thus, the relation of the equation (16) is simplified as shown in the following equation (17) so that the intensity is calculated using the equation (17) when the intensities at the two points on the diagonal line are "1" and the intensities at other points are "0".

$$I(X, Y) = \min\{(1-\Delta x), (1-\Delta y)\} I([X], [Y]) + \min\{(1-\Delta x), \Delta y\} I([X], [Y]+1) + \min\{\Delta x, \Delta y\} I([X]+1, [Y]+1) + \min\{\Delta x, (1-\Delta y)\} I([x]+1, [y]) \quad (17)$$

where min (A, B) means that the smaller one of A and B is selected.

(5) As discussed above, when the intensities at the two points on the diagonal line are "1" and the intensities at other points are "0", the intensities on the diagonal line are lower as seen from FIG. 5b. Thus, the circuit is designed such that the intensity of the point under consideration determined by the equation (8) is increased when the above condition is met. For example, the intensity is doubled. Thus, even if the threshold level is fixed to ½, it essentially corresponds to the reduction of the threshold level and the jagginess of the diagonal line can be avoided as is done in the approach (2) above.

The intensities derived from the approaches (3) to (5) are not normalized. For example, the density derived from the equation (17) is 2 at maximum. It has been confirmed by an experiment that a transformed image produced by digitizing the resulting intensity is a very natural and satisfactory image.

While the original image in the above approaches have been shown as a binary image having "1" and "0" values, it should be understood that the above approaches are applicable to a gray level image. In this case, the diagonal line condition is determined when the difference between the intensities of the two points on the diagonal line and the intensities of other points is larger than a predetermined magnitude.

Embodiments of apparatus for transforming the image in accordance with the principle of the present invention described above are now explained in detail.

Figure 7:
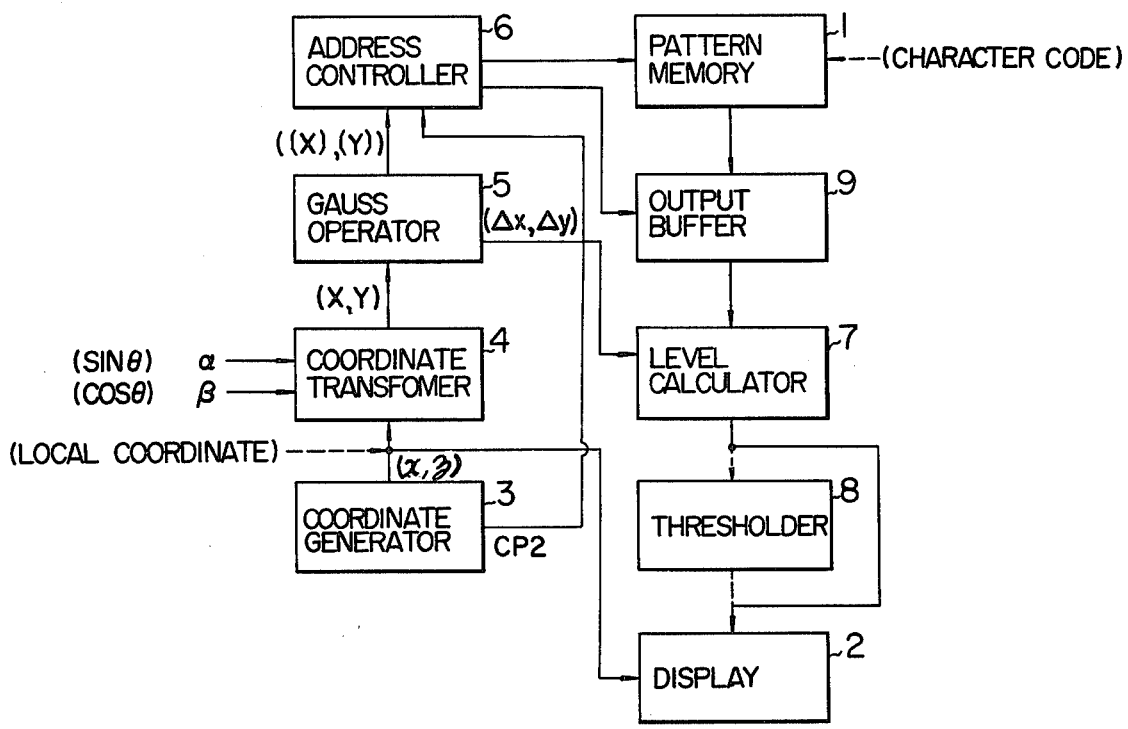
FIG. 7 shows a configuration of one embodiment of a pattern display device which embodies the present invention.

FIG. 7 shows an embodiment of a basic configuration of an image processing apparatus which implements the image transform method of the present invention.

Referring to FIG. 7, a pattern memory 1 stores the original image I(x, y), and the transformed image J (x, y) is supplied to a display 2, such as a display device or a printer, and is displayed thereon. A coordinate generator 3 supplies coordinate data (x, y) to other circuits. A coordinate transformer 4 calculates X and Y by the equations (2) and (3) or (4) and (5) based on the coordinates (x, y) generated by the coordinate generator 3 and externally supplied parameters such as $\alpha$ and $\beta$ or $\sin \theta$ and $\cos \theta$. The values X and Y calculated by the coordinate transformer 4 are supplied to a Gauss operator 5 and converted to integers, which are then supplied to an address controller 6. The address controller 6 supplies coordinates of the four points A, B, C and D shown in FIG. 3 to the pattern memory 1. Thus, levels of the four picture elements A, B, C and D are supplied from the pattern memory 1 to a level calculator 7 through an output buffer 9. The level calculator 7 operates the equation (8) for the input levels to calculate the level of the transformed image J (x, y). The image thus produced is again digitized by a thresholder 8, an output of which is supplied to the display 2.

The display 2 receives the level from the thresholder 8 as well as the coordinates (x, y) from the coordinate generator 3 to display the image.

The display 2 may be a display device or a printer and has a memory to temporarily store the transformed image for use in the subsequent display.

With the display 2 having a memory, the output of the thresholder 8 is written into the memory using the output of the coordinate generator 3 as a memory address. The coordinate generator 3 sequentially generates the coordinates so that all of the necessary areas of the pattern memory 1 or the memory of the display 2 are read or written.

In this manner, the original image on the pattern memory is enlarged or otherwise transformed at a desired transform factor and the transformed image is written into the memory of the display 2.

When a CRT display is used as the display 2, the coordinate generator 3 operates in synchronism with a raster scan of the CRT. When a bright point of the CRT is at a left top point of the screen, the coordinate generator 3 generates coordinates (0, 0), and it sequentially increments the value of x, and when the bright point of the CRT reaches a rightmost point, it resets x to zero and increments y by one. The above operation is repeated until the bright point reaches a right bottom point, when the coordinate generator 3 resets y to zero. The output of the thresholder 8 is applied as a brightness signal of the CRT.

In this manner, the image stored in the pattern memory 1 is transformed to a desired image to display it on the CRT screen. The circuit must be designed such that when coordinates which are not present in the pattern memory 1 are generated by the address controller 6, an output "0" is forcibly produced.

When the present invention is applied to a character display, the pattern memory 1 is a so-called character generator. The character generator usually comprises a ROM (read-only memory). When a character code and local coordinates of the character in a display area on the display are sequentially applied as addresses of the ROM, the levels of dots of the corresponding character are produced as "1" or "0" signals. Accordingly, in such an application, the character codes are externally supplied to the pattern memory 1, and the local coordinates are externally supplied in place of the output of the coordinate generator 3.

In this case, overall control of the CRT display is carried out by a unit other than the units shown in FIG. 7, but a basic concept is identical to what has been explained about the CRT display. Since the technology of the character display is well known, it is not explained in detail.

In the present embodiment, a character (or other symbol) pattern of any desired size can be displayed on the CRT screen by merely providing the character generator (ROM).

When a wire dot type printer is used as the display 2, the coordinate generator 3 operates in synchronism with the movement of a print mechanism and the output from the thresholder 8 is used as a drive signal to the print wires.

In a further application, an image signal source such as a television camera, may be used instead of the pattern memory 1. In this case, the address controller 6 generates a scan signal for the television camera and a two-dimensional local memory is added to the television camera to simultaneously produce data of four adjacent picture elements. It is necessary to control the coordinate controller 3 such that the signal from the address controller 6 is proper for the scan velocity of the television camera. A semiconductor television camera is preferable for this application because it essentially has no limit to the scan velocity and uses a digital scan.

In the configuration shown in FIG. 7, the binary image is handled and the output of the calculator 7 is applied to the display 2 through the thresholder 8. Alternatively, a multi-valued gray level image may be handled. In that case, the output of the calculator 7 is directly applied to the display 2.

Specific embodiments of the blocks shown in FIG. 7 are now explained in detail.

The pattern memory 1 is a memory to store the original image which may be one of a variety of memories depending on the application of the present invention. For example, a semiconductor memory (RAM or ROM) or a memory (disc memory or magnetic bubble memory) is ready to use at the present stage. An optical memory may be used or a device for generating image data such as a television camera may be used in place of the memory.

Figure 8:
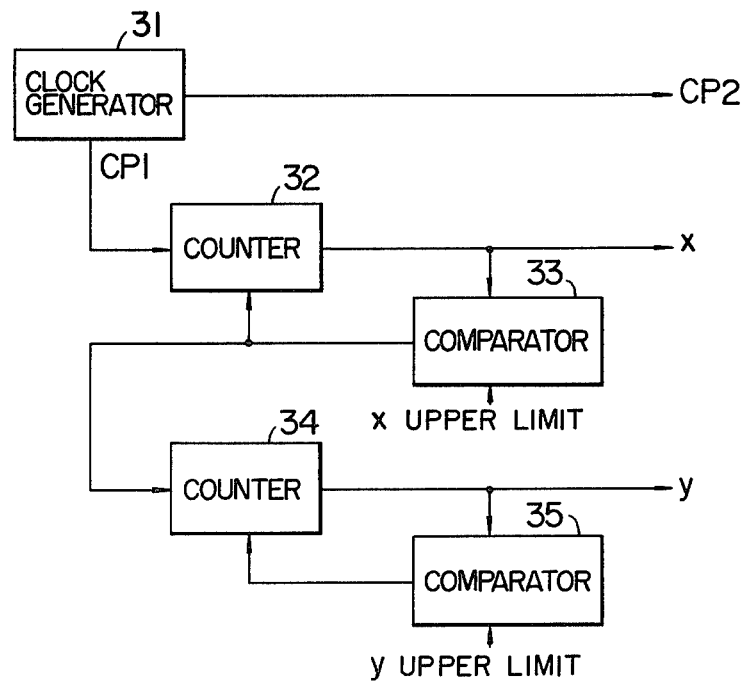
FIG. 8 shows a specific configuration of a coordinate generator shown in FIG. 7, FIGS. 9 and 10 show specific configurations of a coordinate transformer shown in FIG. 7.

The coordinate generator 3 may be simply constructed by IC counters as shown in FIG. 8. Referring to FIG. 8, a clock generator 31 generates clock pulses CP1 and counter 32 is incremented by one each time it receives the clock pulse CP1. When a comparator 33 detects that the count has reached an x upper limit, it resets the counter 32 to zero. The count of the counter 32 is supplied to other circuits as an X-coordinate x. A counter 34 counts up the pulses which reset the X-coordinate counter 32. It is also reset to zero by a pulse produced by the comparator 35 when the count has reached a y-upper limit. The count of the counter 34 indicates a Y-coordinate y.

The clock generator 31 generates clock pulses CP2 which are four times as fast as the pulses CP1 applied to the counter 32. The clock pulses CP2 are used in the circuit to be described later.

Figure 9:
Figure 10:
Figure 10:
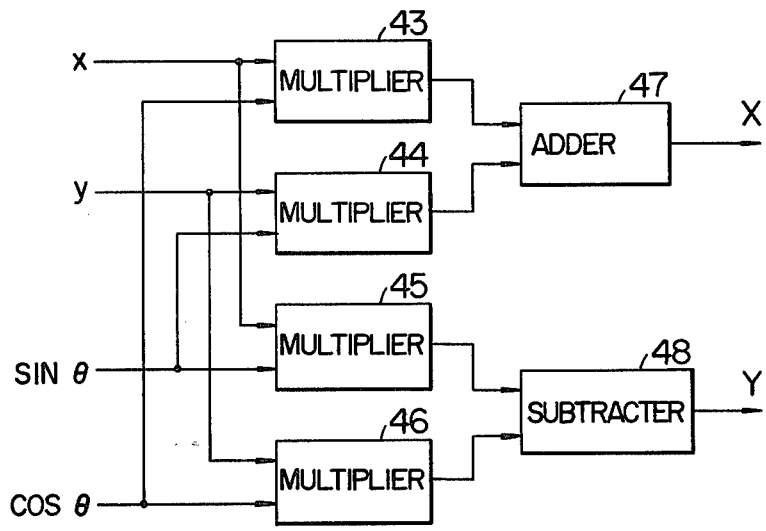

The coordinate transformer 4 may be constructed as shown in FIGS. 9 and 10. FIG. 9 shows an embodiment for enlarging (or reducing) the image. A multiplier 41 multiplies an externally applied enlargement (reduction) parameter $\alpha$ by the coordinate x which is the output of the counter 32 shown in FIG. 8 to produce a product X. Since the parameter $\alpha$ is usually not an integer, a fixed decimal point binary operation is carried out. A multiplier 42 multiplies an external parameter $\beta$ by the output y of the counter 34 shown in FIG. 8 to produce a product Y. FIG. 10 shows an embodiment for rotating the image. Parameters $\sin \theta$ and $\cos \theta$ are externally applied and multipliers 43 to 46, an adder 47 and a subtractor 48 operate in accordance with the equations (4) and (5).

The Gauss operator 5 may be implemented in the following manner. As described above, since the multiplication is carried out by the fixed decimal point operation, the Gauss operation can be carried out by disregarding the decimal fraction. More particularly, if a decimal point is at n-th bit position in a binary notation, the n low order bits are neglected and only the high order bits are transferred to the succeeding stage. Thus, the output of the coordinate transformer 4 is separated into n low order bits and high order bits by the Gauss operator 5. In this manner, the equation (8) is operated and [X] and [Y] shown in FIG. 3 are produced. The low order bits are used in a subsequent step as $\Delta x$ and $\Delta y$.

The Gauss operation is explained by a simple example. For example, when the X-coordinate x is 9 and $\alpha$ is 0.25, x is represented in binary notation as (0000 1001) and $\alpha$ is represented as (0000. 0100). For the sake of easy understanding, a decimal point "." is used although it does not appear in the data in the actual circuit. In the present example, the decimal point is at the fourth bit position. A product of x and $\alpha$ is equal to 2.25 which is (0010. 0100) in binary notation. This is outputted from the multiplier 41 of FIG. 9. By disregarding the four low order bits (which represent $\Delta x$), the binary number (0010) is derived, which indicates 2 or [2.25].

While a small number of bits of the binary number was shown for the sake of simplicity, the binary number actually may have two to four times as many bits as that shown above to assure necessary calculation precision.

Figure 11:
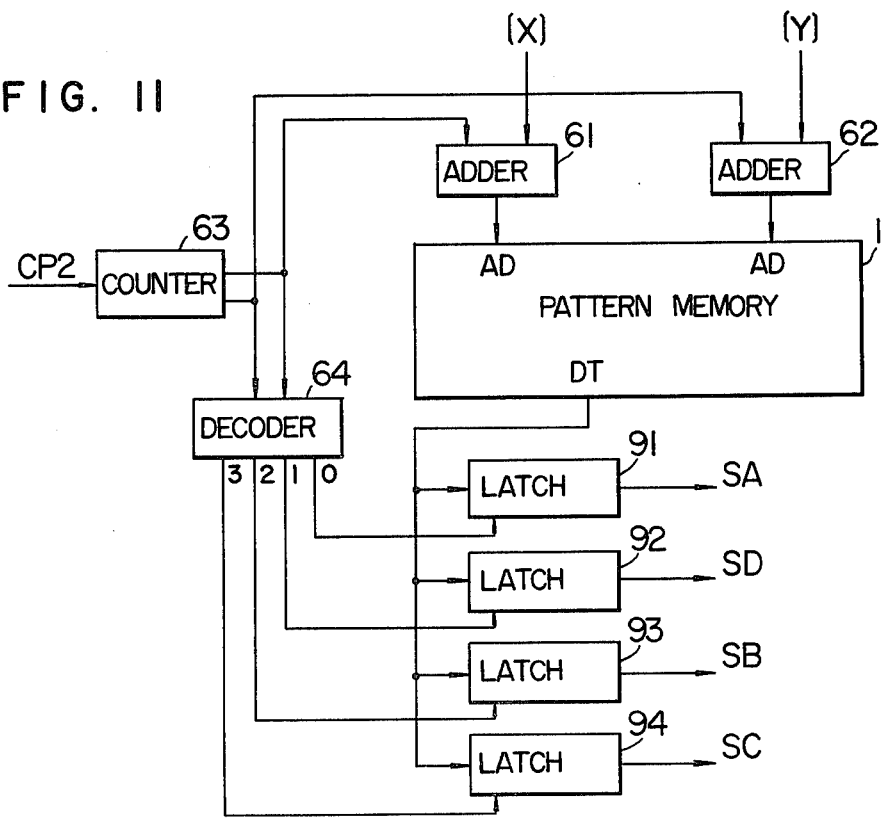
FIG. 11 shows a specific configuration of an address controller, a pattern memory and an output buffer shown in FIG. 7.

Referring to FIG. 11, specific embodiments of the address controller 6, the pattern memory 1 and the output buffer 9 are now explained. Adders 61 and 62 add the output of a counter 63 to [X] and [Y], respectively, produced by the Gauss operator 5. The resulting sums are used as an address to the pattern memory 1.

The counter 63 counts the clock pulses CP2 supplied from the clock generator 31. The count of the counter 63 changes from 0 to 1, 2 and 3 then returns to 0. Since the clock pulses CP2 are four times as fast as the pulses CP1 applied to the X-coordinate counter 32 as described above, the counter 63 counts one cycle of 0-3 while one set of X and Y coordinates is being processed.

On the other hand, the content of the counter 63 is also applied to a decoder 64, an output of which is used as write pulses into latches 91 to 94. Accordingly, during one cycle of the counter 63, the data read from the pattern memory 1 is sequentially written into the latches 91 to 94. During the four times of write operations, the address AD supplied to the pattern memory 1 changes because of the addition of the content of the counter 63. Accordingly, different data DT is written into the latches 91 to 94. The addresses 61 and 62 are wired in the following manner so that the data represents the levels SA, SB, SC and SD of the four adjacent points A, B, C and D shown in FIG. 3.

The least significant bit of the counter 63 is coupled to the adder 61 and the next less significant bit of the counter 63 is coupled to the adder 62. Thus, the following relation is obtained.

| | Content of Counter 63 | Address to Pattern Memory |
|---|---|---|
| (0) | 00 | ([X], [Y]) |
| (1) | 01 | ([X] + 1, [Y]) |
| (2) | 10 | ([X], [Y] + 1) |
| (3) | 11 | ([X] + 1, [Y] + 1) |

Since [X] and [Y] are the coordinates of the point A shown in FIG. 3, the four coordinates shown above correspond to the points A, D, B and C shown in FIG. 3.

When a character generator is used as the pattern memory 1, the character codes which are externally applied are supplied as portions of the address of the pattern memory 1.

Figure 12:
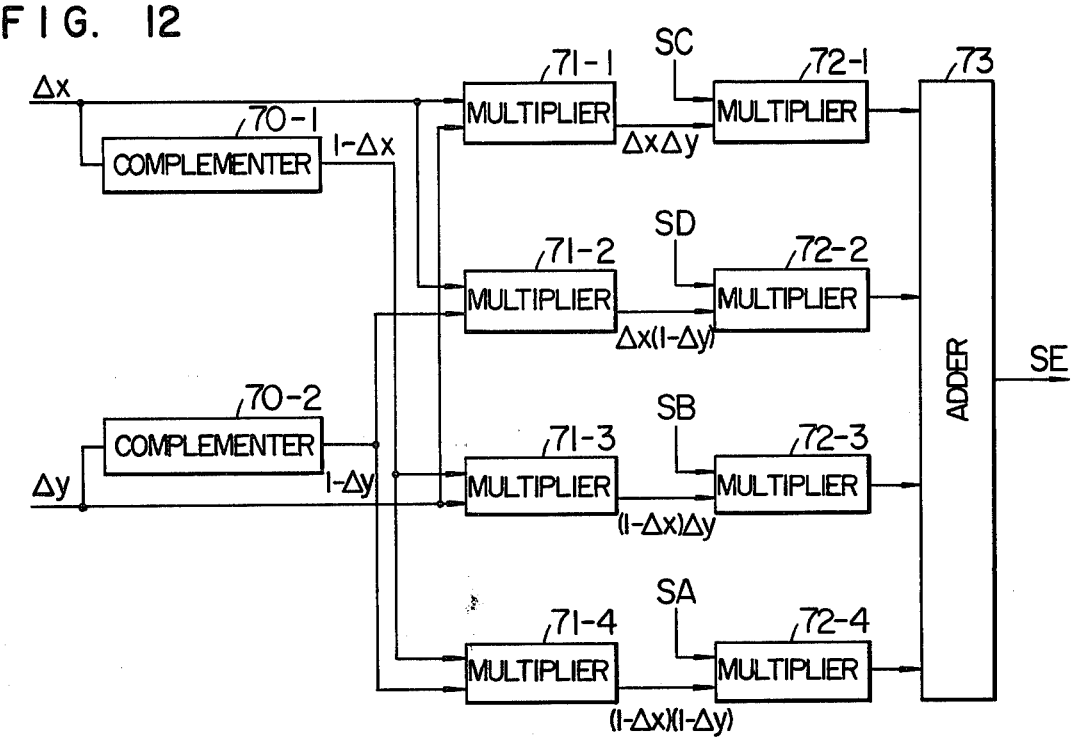
FIG. 12 shows a specific configuration of a calculator shown in FIG. 7.

FIG. 12 shows an embodiment of the calculator 7 which carries out the operation of the equation (8). Referring to FIG. 12, $\Delta x$ and $\Delta y$ represent low order bits (decimal fractions) of X and Y produced by the coordinate transformer 4 shown in FIG. 9 or 10. If the decimal point is at the fourth bit position in the resulting product, the bits at and lower than the fourth bit position are applied to the level calculator 7 from the Gauss operator 5, as already described. In this manner, $\Delta x$ and $\Delta y$ are produced. (This process can be carried out by wiring).

Complementers 70-1 and 70-2 receive $\Delta x$ and $\Delta y$, respectively, from the coordinate transformer 4 and produce outputs $(1-\Delta x)$ and $(1-\Delta y)$, respectively. Multipliers 71-1 to 71-4 receive the outputs of the complementers 70-1 and 70-2 and $\Delta x$ and $\Delta y$ to produce outputs $\Delta x \Delta y$, $\Delta x(1-\Delta y)$, $(1-\Delta x)\Delta y$ and $(1-\Delta x)(1-\Delta y)$. Multipliers 72-1 to 72-4 multiply the outputs of the multipliers 71-1 to 71-4 by the levels SA, SB SC and SD of the points A, B, C and D. Finally, an adder 73 sums the outputs of the multipliers 72-1 to 72-4 to produce a total sum SE. In this manner, the operation of the equation (8) is carried out.

When an object is a binary image, the multipliers 72-1 to 72-4 may be simple selectors which pass the signals when the level is "1" and block the signals when the level is "0".

The thresholder 8 may be implemented by a comparator. Since the display 2 has been discussed in detail above, it is not repeated here.

The present system can be realized by the software of a microcomputer. In that case, the program capacity is less than several hundreds bytes and the operation speed varies depending on the type of the microcomputer and the language used. By way of example, when the Intel 8086 and the PL/M-86 are used, the execution time required to enlarge a 16×18-picture element KANJI pattern by a factor of four is 0.2 second. (when assembler language is used, the speed is increased by a factor of ten.)

Alternatively, many other configurations, such as a combination of software and hardware or a so-called pipeline operation, may be used in order to compromise cost and processing speed.

Figure 13:
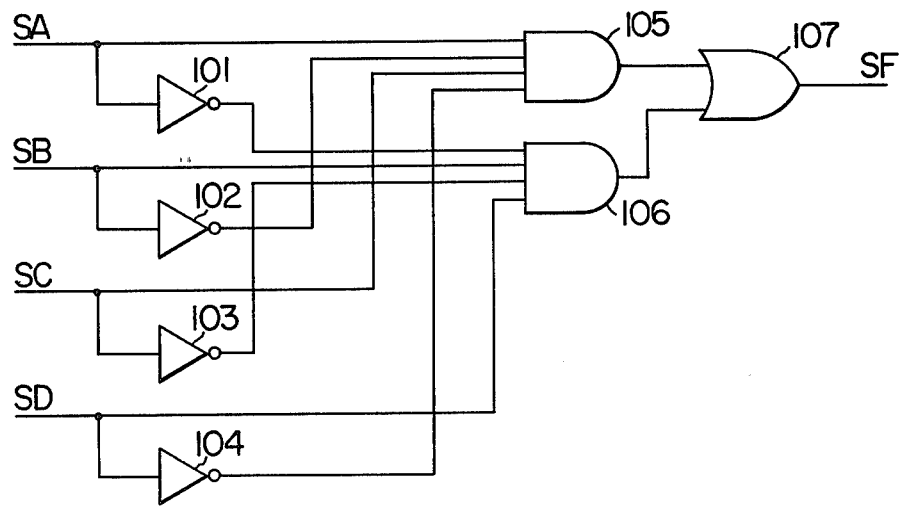
FIG. 13 shows a specific configuration of a diagonal line detector shown in FIG. 7.

Embodiments for the modifications of the present invention are now explained. FIG. 13 shows an embodiment of a diagonal line detector.

It detects when the points on the diagonal line shown in FIG. 3 are "1" and the other two points are "0". Referring to FIG. 13, numerals 101–104 denote inverters, numerals 105 and 106 denote AND gates and numeral 107 denotes an OR gate. With this configuration, when SA="1", SB="0", SC="1" and SD="0" or when SA="0", SB="1", SC="0" and SD="1", an output SF which indicates the presence of a diagonal line assumes the value "1". When an object is a multi-valued image having levels which include "0" and "1" as well as other values, these levels are digitized at a predetermined threshold before they are supplied to the circuit of FIG. 13.

The circuit of FIG. 13 may be arranged in the calculator 7 of FIG. 12 or may be constructed as a separate detector.

Apparatus which implements the approaches (2) to (5) described above when the circuit of FIG. 13 detects the presence of the diagonal line are now explained.

Figure 14:
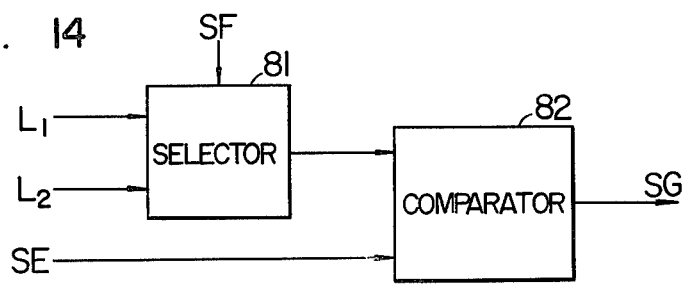
FIG. 14 shows a specific configuration of a thresholder shown in FIG. 7, and FIGS. 15 to 17 show modifications of the calculator shown in FIG. 7.

In order to implement the approach (2), a circuit shown in FIG. 14 is provided at the thresholder 8 of FIG. 7.

Referring to FIG. 14, a selector 81 selects a threshold L1 or L2 depending on the output SF of the detector of FIG. 13. If the detector of FIG. 13 detects the diagonal line to produce the "1" output SF, the selector selects the threshold level L2, e.g. $\frac{1}{4}$ instead of the ordinary threshold level L1, e.g. $\frac{1}{2}$. A comparator 82 compares the output SE of the adder 73 of FIG. 12 with the output of the selector 81 and supplies a compare output SG to the display 2.

In order to implement the approach (3), a circuit shown in FIG. 15 is used in place of each of the multipliers 71-1 to 71-4 shown in FIG. 12. FIG. 15 shows a circuit which is used in place of the multiplier 71-1 of FIG. 12.

Referring to FIG. 15, numeral 74 denotes a multiplier, numeral 75 denotes a root calculator and numeral 76 denotes a selector.

With the above construction, the multiplier 74 multiplies $\Delta x$ by $\Delta y$ and the product is directly applied to the selector 76 and to the root calculator 75 which calculates $\sqrt{\Delta x \Delta y}$, which is also applied to the selector 76. When the signal SF is "0", that is, when the diagonal line is not present, the selector 76 selects the output of the multiplier 74, and when the signal SF is "1" or the diagonal line is present the selector 76 selects the output of the root calculator 75.

In order to implement the approach (4), the circuit shown in FIG. 16 is used in place of each of the multipliers 71-1 to 71-4 of FIG. 12. FIG. 16 shows the circuit to be used in place of the multiplier 71-1 of FIG. 12.

Referring to FIG. 16, numeral 77 denotes a multiplier, numeral 78 denotes a calculator which outputs the smaller one of two inputs, and numeral 79 denotes a selector.

With this configuration, the multiplier 77 multiplies $\Delta x$ by $\Delta y$ and the calculator 78 outputs the smaller one of $\Delta x$ and $\Delta y$. The outputs of the circuits 77 and 78 are applied to the selector 79. The selector 79 selects the output of the multiplier 77 when the diagonal line is not detected, and selects the output of the calculator 78 when the diagonal line is detected.

In order to implement the approach (5), a circuit shown in FIG. 17 is connected to the output of the adder 73 of FIG. 12.

Referring to FIG. 17, numeral 111 denotes a calculator which produces an output of double value of an input value, and numeral 112 denotes a selector.

With this configuration, the output SE of the adder 73 of FIG. 12 is directly applied to the selector 112 and also applied thereto through the calculator 111. The calculator 111 doubles the input level. The selector selects the output SE of the adder 73 in a normal case, and selects the output of the calculator 111 when the diagonal line is detected.

As described hereinabove, according to the present invention, the transformed digital image can be instantly determined by the simple operation of the equation (8) using the levels of the picture elements of the untransformed digital image. Accordingly, the apparatus for implementing the present invention can be simplified and the process time is significantly reduced.

In addition, in accordance with various improvements of the present invention, the quality of the display of the diagonal line is significantly improved.

What is claimed is:

1. A method for transforming a first image into a second image having a different scale, location or orientation to obtain an intensity distribution in the second image according to the intensities at discrete positions of the first image which is provided in a matrix manner, comprising:

a first step of calculating a first position in said first image from an arbitrarily-selected second position in the second image on the basis of a selected transformation factor;

a second step of determining a group of the four mutually-nearest discrete positions in the first image which are nearest to the calculated first position;

a third step of determining an intensity weight factor for each of the respective four discrete positions based on the intensity at a respective discrete position and the two distances along column and row directions of the matrix between the calculated first position and the one of the four discrete positions diagonally opposing the respective discrete position and on the basis of the intensity distribution of the four discrete positions; and a fourth step of determining the intensity at the second position by adding the intensity weight factors determined for the respective four discrete positions.

2. The transforming method of claim 1, wherein the third step comprises a fifth step of detecting whether or not the intensity distribution of said four discrete positions represents the presence of a line pattern passing through two diagonally-opposing ones of the four discrete positions, and a sixth step of determining the intensity weight factor for each respective discrete position based on the intensity at the respective discrete position, said two distances and the detection result in said fifth step.

3. The transforming method of claim 12, wherein the sixth step comprises a seventh step of determining the intensity weight factor for each respective discrete positions, when the detection result of said fifth step is negative, based on the intensity at the respective discrete position and the area of a quadrilateral which has two diagonally-opposing apexes located at the calculated first position and at the one discrete position diagonally opposing the respective discrete position and has sides extended in column or row directions of the matrix, and an eighth step of determining the intensity weight factor for each respective discrete position, when the detection result of said fifth step is affirmative, based on the intensity at the respective discrete position and said two distances so that the result determined by the eighth step becomes larger than the result which would be obtained if the seventh step is carried out.

4. The transforming method of claim 3, wherein said eighth step comprises a step of determining the intensity weight factor based on a root of the area of said quadrilateral.

5. The transforming method of claim 3, wherein said eighth step comprises a step of determining the intensity weight factor based on the shorter one of said two distances.

6. The transforming method of claim 3, wherein said eighth step comprises a step of determining the intensity weight factor based on a root of the product of said two distances.

7. The transforming method of claim 2, wherein said first image is a binary image, and said fifth step comprises the step of detecting the presence of said line pattern based on whether or not the intensities at a first pair of diagonally opposing discrete positions are "1" and at the same time the intensities at the other diagonally-opposing discrete positions of the four discrete positions are "0".

8. The transforming method of claim 2, wherein the first image is a gray level image, and said fifth step comprises a step of detecting the difference between the intensities at each of a pair of diagonally-opposing discrete positions and the intensities at the other two discrete positions of the four discrete positions, and a step of detecting the presence of said line pattern based on whether or not the difference for each of the two diagonally-opposing positions exceeds a predetermined value.

9. A method of transforming a first image into a second image having a different scale, location or orientation to obtain an intensity distribution in the second image according to the intensities at discrete positions of the first image which are provided in a matrix manner, comprising:
a first step of calculating a first position in said first image from an arbitrarily-selected second position in the second image on the basis of a selected transformation factor;
a second step of determining a group of four mutually-nearest discrete positions in the first image which are nearest to the calculated first position;
a third step of determining an intensity weight factor for each of the respective four discrete positions, based on the intensity at the respective discrete position and the two distances along column and row directions of the matrix between the calculated first position and the one of the four discrete positions diagonally opposing the respective discrete position;
a fourth step of detecting whether or not intensity distribution of the four discrete positions represents the presence of a line pattern passing through two diagonally-opposing discrete positions of the four discrete positions;
a fifth step of determining the intensity at the second position by adding the intensity weight factors of the respective four discrete positions; and
a sixth step of digitizing the determined intensity of said second position with a threshold so that the threshold has a first value when the result of the detection in said fourth step is negative and a second value lower than the first value when the detection result in said fourth step is affirmative.

10. A method for transforming a first image into a second image having a different scale, location or orientation to obtain an intensity distribution in the second image according to the intensities at discrete positions of the first image which are provided in a matrix manner, comprising:
a first step of calculating a first position in said first image from an arbitrarily-selected second position in the second image on the basis of a selected transformation factor;
a second step of determining a group of four mutually-nearest discrete positions in the first image which are nearest to the calculated first position;
a third step of determining an intensity weight factor for each of the respective four discrete positions, based on the intensity at the respective discrete position and the two distances along column and row directions of the matrix between the calculated first position and the one of the four discrete positions diagonally-opposing the respective discrete position;
a fourth step of detecting whether or not intensity distribution of the four discrete positions represents the presence of a line pattern passing through two diagonally-opposing discrete positions of the four discrete positions;
a fifth step of determining the intensity at the second position by adding the intensity weight factors of the respective four discrete positions; and
a sixth step of increasing the determined intensity of said second position when the detection result of said fourth step is affirmative.

11. A method for transforming a first image into a second image having a different scale, location or orientation to obtain an intensity distribution in the second image according to the intensities at discrete positions of the first image, comprising:
a first step of providing said first image wherein the discrete positions thereof are located respectively at the apexes of a plurality of equilateral triangles;
a second step of calculating a first position in said first image from an arbitrarily-selected second position in the second image on the basis of a selected transformation factor;
a third step of determining the group of the three mutually-nearest discrete positions in the first image which form the equilateral triangle within which the first position is located;
a fourth step of determining an intensity weight factor for each of the respective three discrete positions, based on the intensity at the respective discrete position and the area of a triangle which has apexes at the calculated first position and at the other two of the discrete positions; and a fifth step of determining the intensity at the second position by adding the intensity weight factors determined for the three discrete positions.

12. An apparatus for transforming a first image into a second image having a different scale, location or orientation to obtain an intensity distribution in the second image according to the intensities at discrete positions of the first image, comprising:

storage means for storing said first image in the form of a column and row matrix of data values indicating the intensities at said discrete positions of said first image;

means for calculating a first position in said first image from an arbitrarily-selected second position in said second image on the basis of a selected transformation factor, including means for determining the distances along column and row directions of the matrix between the calculated first position and the respective four discrete positions mutually nearest thereto;

address generator means responsive to said calculating means for generating the addresses of storage locations in said storage means of data values for the four mutually-nearest discrete positions in the first image which are nearest to said calculated first position and for applying said addresses to said storage means to read out said data values; and level calculator means for calculating the level of the intensity at said calculated first position of said first image including first means connected to said storage means and said calculating means for determining an intensity weight factor for each of the respective four discrete positions for which data is read out of said storage means based on the intensity at a respective discrete position and the two distances along column and row directions of the matrix between the calculated first position and the one of the four discrete positions diagonally-opposing the respective discrete position and on the basis of the intensity distribution of the four discrete positions, and second means for adding the intensity weight factors determined by said first means.

13. An apparatus according to claim 12, wherein said first means in said level calculator means includes diagonal line detector means for detecting whether the intensity distribution of said four discrete positions represents the presence of a line pattern passing through two diagonally-opposing ones of said four discrete positions.

14. An apparatus according to claim 13, wherein said data values stored in said storage means are binary values, and wherein said diagonal line detector means includes means for detecting whether the data values at a first pair of diagonally-opposing discrete positions as read from said storage means in response to said address generator means are of one binary value while the data values at the other opposing discrete positions of the four discrete positions are of the opposite binary value.

15. An apparatus according to claim 13, wherein said data values stored in said storage means are gray level values, and wherein said diagonal line detector means includes means for detecting the difference between the data values for each of a pair of diagonally-opposing discrete positions and the intensities at the other two discrete positions of the four discrete positions for which data is read from said storage means in response to said address generator means, and means for detecting the presence of said line pattern based on whether or not said detected difference exceeds a predetermined value.

16. An apparatus according to claim 13, wherein said first means of said level calculator means further includes means responsive to said diagonal line detector means for determining the intensity weight factor for each of the four discrete positions (1) based on the data value of the respective discrete position and the area of a quadrilateral which has two diagonally-opposing apexes located at said calculated first position and at the one discrete position diagonally opposing the respective discrete position and sides extending in column or row directions when the diagonal line detector means fails to detect said line pattern and (2) based on the data value of the respective discrete position and said two distances along column and row directions when the diagonal line detector detects said line pattern.

17. An apparatus according to claim 13, wherein said first means of said level calculator means further includes means responsive to said diagonal line detector means for determining the intensity weight factor for each of the four discrete positions (1) based on the data value of the respective discrete position and the area of a quadrilateral which has two diagonally-opposing apexes located at said calculated first position and at the one discrete position diagonally opposing the respective discrete position and sides extending in column or row directions when the diagonal line detector means fails to detect said line pattern, and (2) based on the data value of the respective discrete position and the shorter of said two distances along column and row directions when the diagonal line detector detects said line pattern.

* * * * *